3,379,738
2-ANILINO-1,4-DIHYDROXYANTHRAQUINONES

David J. Wallace, and James M. Straley, Kingsport, Tenn., assignors to Eastman Kodak Company, Rochester, N.Y., a corporation of New Jersey
No Drawing. Filed Jan. 21, 1965, Ser. No. 427,149
12 Claims. (Cl. 260—376)

ABSTRACT OF THE DISCLOSURE 1,4-dihydroxyanthraquinone compounds having an anilino group substituted at the 2-position, the anilino group containing a substituted alkyl or alkoxy group, are useful as dyes for hydrophobic textile materials.

---

This invention relates to anthraquinone compounds particularly useful as dyes for hydrophobic fibers such as polyester fibers.

The anthraquinone compounds are anilides of 1,4-dihydroxyanthraquinones having the formula

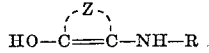

in which Z represents the atoms necessary to complete a substituted or unsubstituted 1,4-dihydroxyanthraquinone radical and R represents a lower hydroxyalkylphenyl radical or a lower hydroxyalkoxyphenyl radical, and the lower alkanoic acid esters and carbamic acid esters thereof, such as hydroxymethylphenyl, ω-hydroxybutylphenyl, acetoxymethylphenyl, acetoxypropylphenyl, carbamyloxymethylphenyl, phenylcarbamyloxymethylphenyl, β-hydroxyethoxyphenyl, hydroxymethoxyphenyl, acetoxymethoxyphenyl, ω-acetoxybutoxyphenyl and β-carbamyloxyethoxyphenyl.

The substituents on the anthraquinone nucleus are not critical and include a wide variety of groups present in the 3, 5, 6, 7 and 8 positions such as nitro, lower alkyl, lower alkoxy, amino and halogen. The hydroxyalkyl anilino and hydroxyalkoxyanilino groups, and esters thereof, in the 2-position appear to enhance the properties of the compounds at least when they are used as textile dyes. A preferred group of the compounds have the formula

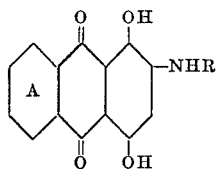

in which ring A is unsubstituted or substituted as described above and R has the meaning given above.

Herein, "lower alkoxy" and "lower alkyl" mean the group in question contains from about 1 to 4 carbon atoms in a straight or branched chain.

The above anilides of quinizarin can be prepared by heating 2-bromoquinizarin or substituted 2-bromoquinizarins with the appropriate hydroxyalkylaniline or hydroxyalkoxyaniline in the manner shown in the examples below. The carboxylic acid esters and carbamic acid esters are prepared therefrom by esterification with the desired aliphatic acid or isocyanate.

The above anilides can be used for dyeing polyester fibers, yarns and fabrics giving fast red to violet shades thereon when applied by conventional dyeing methods. The anilides should be free of water solubilizing sulfo and carboxyl groups to obtain satisfactory dyeings on polyesters. In general, the anilides have good fastness to light, gas (atmospheric fumes) and sublimation. The anilides have substantially better affinity and fastness (particularly sublimation) properties than do similar anilides of quinizarin such as 2-anilino-1,4-dihydroxyanthraquinone, 2 - toluidino - 1,4 - dihydroxyanthraquinone, or 2-sulfanilido-1,4-dihydroxyanthraquinone.

The following examples will serve to illustrate our invention.

Example 1

A mixture of 3.19 g. 2-bromoquinizarin, 1.75 g. of 4-β-hydroxypropylaniline, 1.0 g. dry potassium acetate, and 25 cc. methyl cellosolve was stirred and refluxed for 12 hours. The reaction mixture was chilled and filtered. The cake was reslurried twice in boiling dilute aqueous sodium hydroxide, filtered, washed well with water, and dried. The product dyes polyester fibers a red-violet shade with good fastness properties. It has the structure:

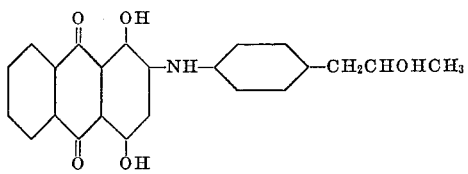

Example 2

1.0 g. of the dye from Example 1 was heated in 5 cc. acetic anhydride at 100° C. for one hour. The reaction mixture was drowned in water and allowed to stand until all of the acetic anhydride had hydrolyzed. The solid product was filtered off, washed with water, and dried The product has the formula:

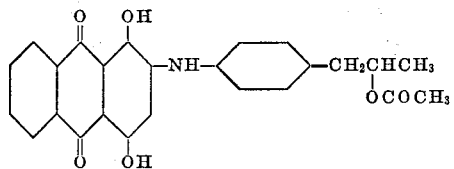

It dyes polyester fibers a violet shade of good fastness properties.

In the manner of the above examples additional 2-anilinoquinizarin derivatives are prepared having the formula

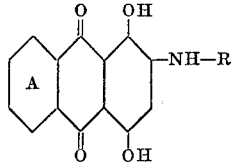

and specific structures and color shown in the following table.

| Ex. | Substituents on Ring A | R | Color |
|---|---|---|---|
| 3 | None | 4-(γ-hydroxypropyl)phenyl | Red. |
| 4 | do | 3-hydroxymethylphenyl | Red. |
| 5 | do | 4-(β-hydroxyethyl)phenyl | Violet. |
| 6 | do | 3-(α-hydroxyethyl)phenyl | Red. |
| 7 | do | 3-(α-acetoxyethyl)phenyl | Red. |
| 8 | do | 3-hydroxymethylphenyl (phenyl carbamic acid ester). | Red. |
| 9 | 6-chloro | 4-(β-hydroxyethyl)phenyl | Violet. |
| 10 | 6-nitro | do | Do. |
| 11 | 5-amino | do | Do. |
| 12 | 5,6,7,8-tetrachloro | 3-hydroxymethylphenyl (phenyl carbamic acid ester). | Blue-Violet. |
| 13 | 5,8-dihydroxy | do | Blue. |
| 14 | 5,8-dimethoxy | 3-hydroxymethylphenyl (phenyl carbamic acid ester). | Violet. |
| 15 | None | 3-acetoxymethylphenyl | Red. |
| 16 | do | 3-(α-propionoxyethylphenyl) | Red. |
| 17 | do | 3-α-hydroxyethylphenyl (carbamic acid ester). | Red. |
| 18 | do | 4-hydroxyethoxyphenyl | Violet. |
| 19 | do | 4-acetoxymethoxyphenyl | Do. |
| 20 | do | 4-benzoxymethoxyphenyl | Do. |
| 21 | do | 3-(γ-hydroxypropoxy) phenyl, phenyl carbamic acid ester. | Red. |
| 22 | do | 3-acetoxymethylphenyl | Red. |
| 23 | do | 4-β-acetoxyethylphenyl | Violet. |

The color indicated in the table is that obtained on dyeing polyethylene terephthalate polyester fiber.

The anthraquinone compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the anthraquinone compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the anthraquinone compounds of the invention are water-insoluble, they can be applied from aqueous dispersions in the manner of the so-called "disperse dyes." However, coloration can also be effected, for example, by incorporating the anthraquinone compounds into the spinning dope and spinning the fiber as usual. The anthraquinone compounds of our invention have varying utility as dyes. The degree of utility varies, for example, depending upon the material being dyed and the formula of the anthraquinone compound. Thus, for example, all the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new anthraquinone compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the anthraquinone compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A compound having the formula

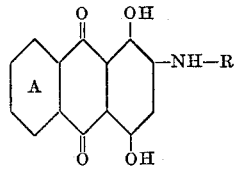

wherein R represents a lower hydroxyalkylphenyl radical, a lower alkanoyloxyalkylphenyl radical, a lower carbamyloxyalkylphenyl radical, a lower hydroxyalkoxyphenyl radical, a lower alkanoyloxyalkoxyphenyl radical, or a lower carbamyloxyalkoxyphenyl radical, and ring A is unsubstituted or substituted with nitro, lower alkyl, lower alkoxy, amino, or halogen.

2. A compound according to claim 1 wherein R represents lower hydroxyalkylphenyl.

3. A compound according to claim 1 wherein R represents lower hydroxyalkoxyphenyl.

4. A compound according to claim 1 wherein R represents lower alkanoyloxyalkylphenyl.

5. A compound according to claim 1 wherein R represents lower alkanoyloxyalkoxyphenyl.

6. The compounds

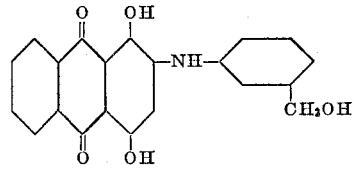

7. The compound

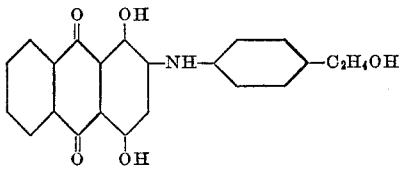

8. The compound

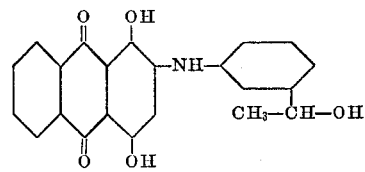

9. The compound

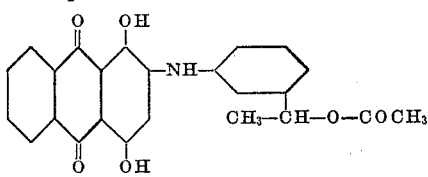

10. The compound
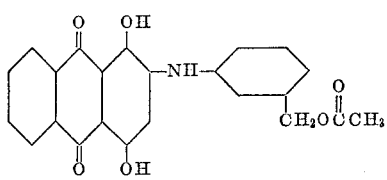
11. The compound
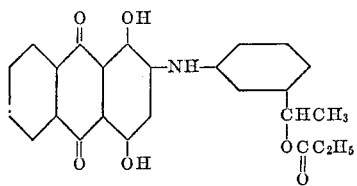
12. The compound
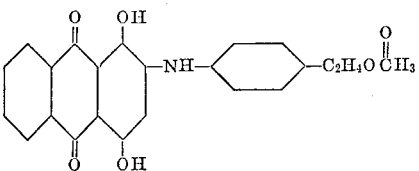
References Cited
UNITED STATES PATENTS
| | | | |
|---|---|---|---|
| 2,766,262 | 10/1956 | Belshaw | 260—376 |
| 2,819,275 | 1/1958 | Grossmann et al. | 260—380 |
| 2,819,288 | 1/1958 | Grossmann | 260—377 |
| 3,097,909 | 7/1963 | Rhyner et al. | 260—376 X |
| 3,210,383 | 10/1965 | Ferrari et al. | 260—380 |
| 3,284,473 | 11/1966 | Ramanathan | 260—375 |
FOREIGN PATENTS
| | | |
|---|---|---|
| 86,150 | 1896 | Germany. |
| 114,199 | 1900 | Germany. |
| 1,336,690 | 1963 | France. |
LORRAINE A. WEINBERGER, *Primary Examiner.*
H. C. WEGNER, *Assistant Examiner.*